Figures 1, 2, 3:
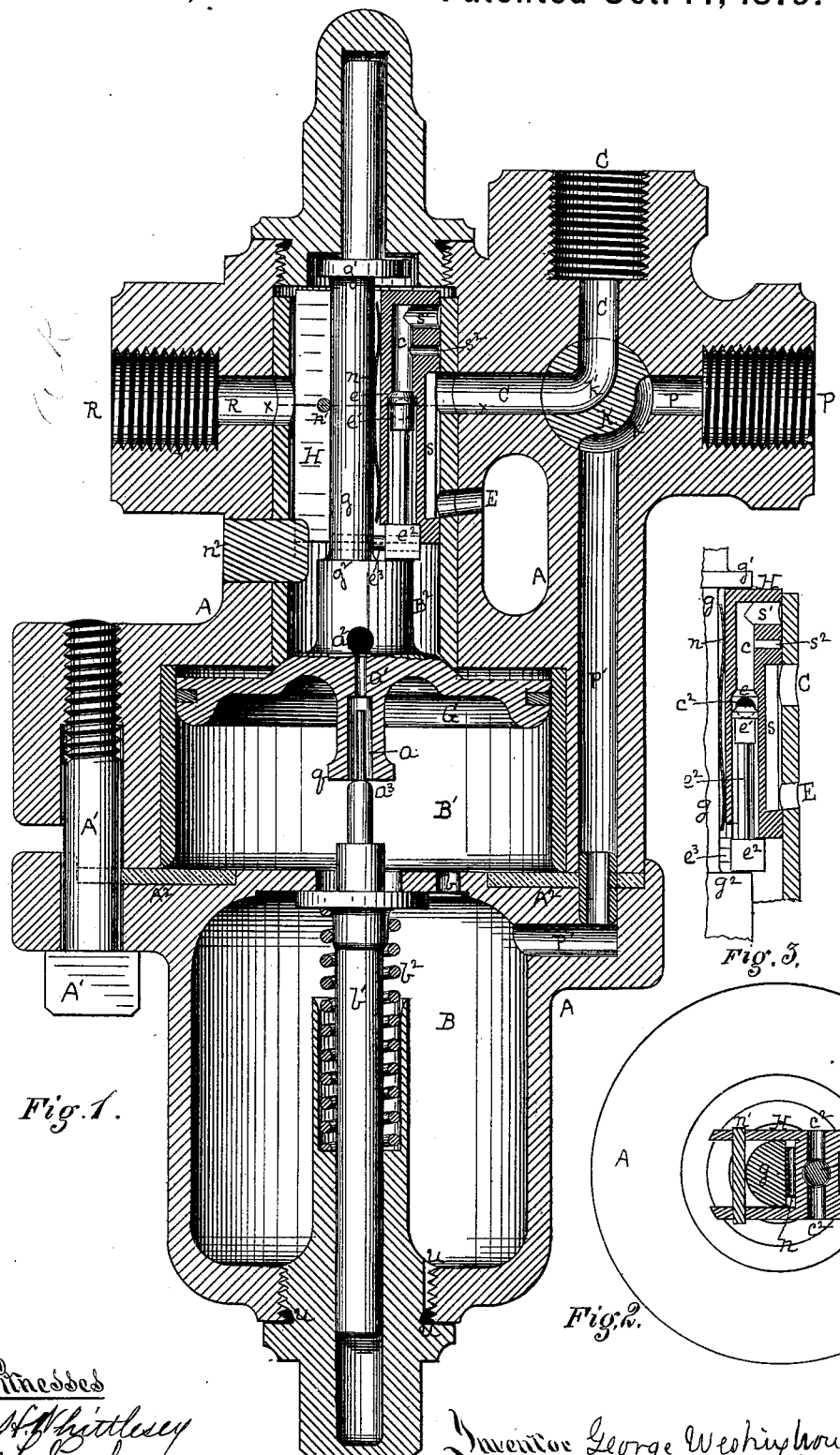

G. WESTINGHOUSE, Jr.
Regulating-Valve for Automatic-Brakes.
No. 220,556. Patented Oct. 14, 1879.

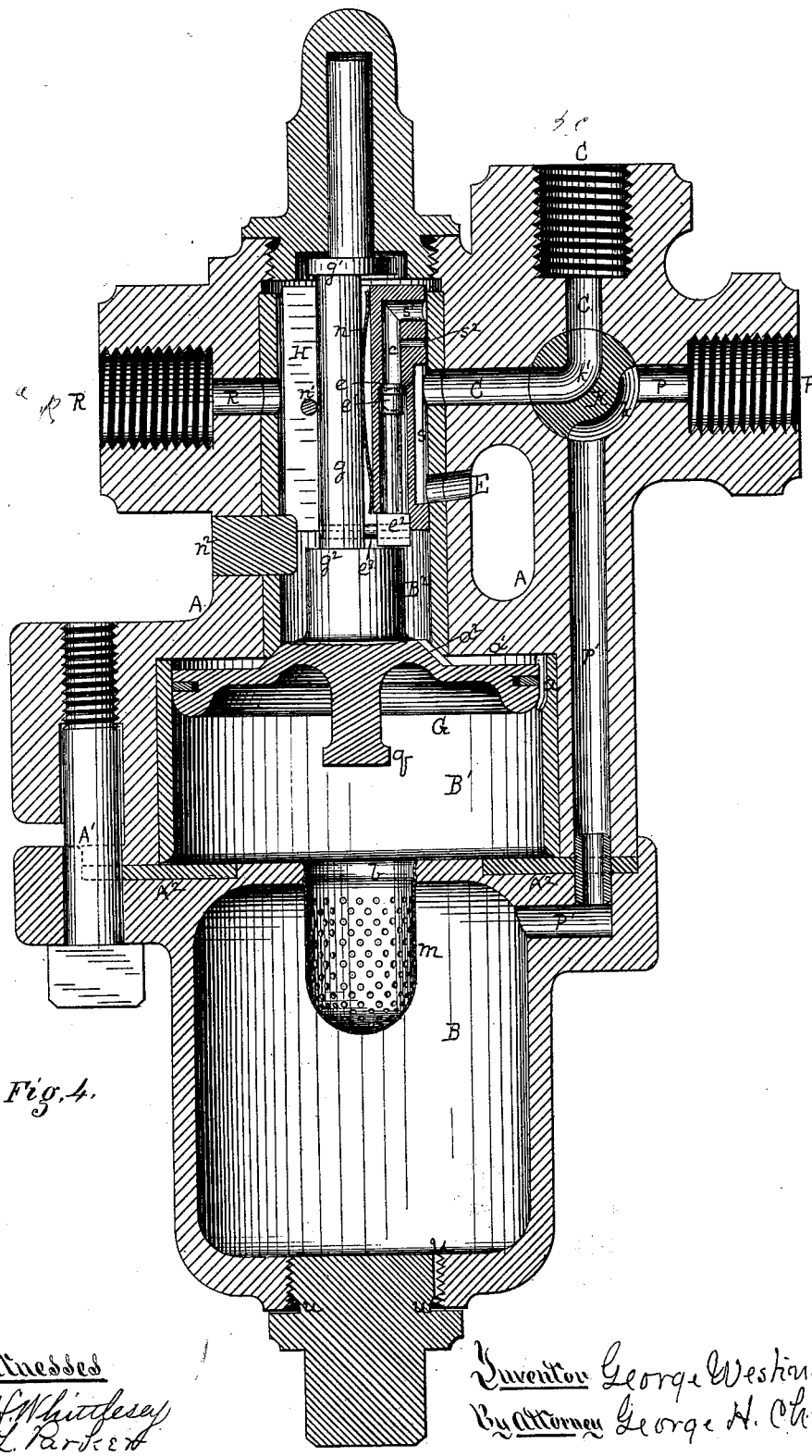

UNITED STATES PATENT OFFICE.

GEORGE WESTINGHOUSE, JR., OF PITTSBURG, PENNSYLVANIA.

IMPROVEMENT IN REGULATING-VALVES FOR AUTOMATIC BRAKES.

Specification forming part of Letters Patent No. 220,556, dated October 14, 1879; application filed September 17, 1879.

*To all whom it may concern:*

Be it known that I, GEORGE WESTINGHOUSE, Jr., of Pittsburg, county of Allegheny, State of Pennsylvania, have invented or discovered a new and useful Improvement in Regulating-Valves for Automatic Brakes; and I do hereby declare the following to be a full, clear, concise, and exact description thereof, reference being had to the accompanying drawings, making a part of this specification, in which—like letters indicating like parts—

Figure 1, Sheet 1, is a vertical sectional view of the triple-valve device illustrative of my improvements. Fig. 2 is a transverse horizontal section in the line $x\ x$ of Fig. 1. Fig. 3 is a detached sectional view of the slide and auxiliary valves, valve-seats, and stems, as shown in Fig. 1, but with the auxiliary valve in a different position; and Fig. 4, Sheet 2, by a view similar to Fig. 1, illustrates some modified features of construction.

In the class of fluid-pressure brakes for railway-trains commonly known in this country as "automatic brakes," a device usually termed a "triple valve" is extensively used. This device, in two of the many forms in which it has been patented, is shown and described in United States Patents granted to me October 5, 1875, No. 168,359, and January 11, 1876, No. 172,064, as well as in various other earlier and later patents.

It is important in such device that the valve (lettered H in said two patents and herein) which governs the flow of air or other fluid shall move not only with great certainty to any desired position, but also shall move with slight variations of pressure on the piston, (lettered G,) so that the application of the brakes with any desired power, and their ready release, may be quickly and easily effected at the pleasure of the engineer.

To this end I combine with the said valve H, giving it a slight range of motion on its stem, an auxiliary valve operated by the same stem, in such manner that a portion of the functions performed in said patents by the valve H may now be performed by such auxiliary valve, the latter moving with practically no resistance, and hence moving more quickly and with less pressure than the valve H itself. The same auxiliary valve is also designed for use, under certain circumstances, as a leakage-valve. In the drawings I have shown it as applied to or embodied in a triple valve having the graduating-stem and spring of said patents, and also as used without them. The former will be first described with reference to Figs. 1 to 3.

A represents the valve-case, made preferably in two parts, united by the necessary number of screw-bolts $A^1$, with interposed packing $A^2$.

B is a drip-chamber; $B^1$, the cylinder in which the piston G is operated, and $B^2$ is an upper chamber, through which the fluid passes under pressure to the auxiliary reservoir by the port R, or to the brake-cylinder by the port C. It is also a valve-chamber for the slide-valve H, which is secured on the stem, in any suitable way, by a pin, $n^1$, going through the back U-shaped wings of the valve, and is held to its seat by any suitable spring, as at $n$, and rotation on the stem is prevented by a stud, $n^2$.

A cock, K, with ports $k\ k'$, is arranged in the line of fluid-pressure communication, substantially as represented, and for purposes which will be understood by reference to said patents.

From the port P connection is made with the brake-pipe, and from the port C with the cylinders. With the devices in the position shown in Fig. 1 the brake apparatus is in the normal condition for the running of the train. The fluid-pressure then enters the port P, passes by $k$ P' into chamber B, through port $b$ into $B^1$ beneath the piston G, and holds the latter up in the position shown. It then passes through ports $a\ a^1\ a^2$ into chamber $B^2$, and thence to the auxiliary reservoir through port R.

The details of construction and the functions of these parts will be readily understood from the drawings and the patents above named.

The graduating-stem $b^1$ and spring $b^2$, including the reduced upper end of the stem, have also the construction and operation described in the second of said patents.

The piston-stem $g$ operates the valve H; but the collar $g^1$ and shoulder $g^2$, which bear on the opposite ends of the valve or its connections and give it its motion, are a little farther apart—say about one-eighth ($\frac{1}{8}$) of an inch, more or less—than the distance between the end bearings of the valve H.

The distance between the open end of the port $a$ and the shoulder $a^3$ on the stem $b^1$, when the piston G is at the highest point of its stroke, is by preference somewhat less— say one-sixteenth ($\frac{1}{16}$) of an inch, more or less.

The valve H has a cavity, $s$, long enough to uncover the port C and the exhaust-port E and put them in communication. It has also two additional ports, $s^1$ $s^2$, the former having a diameter, by preference, of about three-sixteenths ($\frac{3}{16}$) of an inch, and the latter of about five-sixty-fourths ($\frac{5}{64}$) of an inch, in a device of the proportions shown; but I do not confine myself in my invention to these exact figures or proportions, but include all such variations therefrom as give substantially a like construction and operation.

The distance between the ports $s$ and $s^1$ is equal to or slightly in excess of the diameter of the port C at the valve-seat. The port $s^1$ communicates by a passage, $c$, with the open end of the valve H. Transverse to this passage, and opening therein, is a cross-port, $c^2$, Fig. 3, extending to the exterior of the valve H on one or both sides. Between the point of junction of this port with the passage $c$ and the port $s^1$, I make a valve-seat, $e$, and seat thereon a valve, $e^1$, the stem $e^2$ of which is connected by a pin, $e^3$, with the stem $g$.

It will now be seen that any motion imparted to the piston G, Fig. 1, will, through the stem $g$, be first operative in unseating the valve $e^1$, the valve H being held by frictional contact with its seat, so that the stem $g$ will slide through it until the collar $g'$ engages the upper end thereof. Also, after any portion of an up or down stroke is made by the piston G, the first motion thereof in an opposite direction will first shift the auxiliary valve $e^1$ to or from its seat, as the case may be, before any motion is imparted to the valve H.

In order now to apply the brakes fluid-pressure is allowed to escape from below the piston G by the manipulation of the cock on the locomotive or other escape-cock. Fluid-pressure then acts back from the auxiliary reservoir on top of G, and forces it down, first closing the port $a$, and at the same time unseating the valve $e^1$, and bringing the latter and the devices immediately connected therewith into the relative positions shown in Fig. 3. But a very slight reduction of pressure below G is required in order to do this. The downstroke of G is continued, shifting the valve H downward rapidly or slowly, until the port $s^1$ comes partly or fully into line with C.

The escape at E is then closed, and the ports and passages are open for fluid-pressure to pass from the auxiliary reservoir by R, $c^2$, $c$, $s^1$, and C to the brake-cylinder and cause the application of the brakes. In this motion of H, however, it should be noted that the small port $s^2$ is, while passing the open end of C, in communication with the exhaust E; but the amount of air thus escaping through a port so small is practically inappreciable, and does not interfere with the action described. When now the valve H is thus shifted, so that the port $s$, shall, to the extent of one-quarter or one-half its capacity, more or less, as is usual when less than a maximum braking force is desired, be thus brought into communication with the port C, and held there until the limited or desired amount of fluid-pressure shall have passed into the brake-cylinder, the auxiliary valve $e^1$ becomes available as a quick and ready means of closing the supply-port with certainty, without danger of opening the exhaust. To this end a very slight increase or excess of pressure below the piston G—much less in, fact, than is necessary to shift the valve H—will suffice to move the piston G and stem $g$ far enough to close the valve $e^1$ on its seat $e$. All ports are thus closed by an almost instantaneous motion, and the brakes remain on with a force corresponding to the amount of pressure previously charged into the brake-cylinder.

In case a slight addition to the operative braking force is desired, either to compensate for loss by leakage or for any other reason, it may be secured by a slight downward motion of the piston G, such as will unseat the auxiliary valve $e^1$. In this manner the graduating friction may be more advantageously performed than heretofore. But the use of this auxiliary valve enables me to dispense entirely with the graduating stem and spring, and in this combination it is illustrated in Fig. 4, Sheet 2.

With the valve H of the patents above named, if the graduating spring and stem were omitted it would be found that after the slide-valve H had been so far shifted in applying the brakes as to permit a moderate or limited quantity of fluid-pressure to pass from the auxiliary reservoir to the brake-cylinder, in such case the amount of power of fluid-pressure necessary to shift such valve part way back, and thus close the port leading to the brake-cylinder, and thereby hold or retain the limited amount or degree of pressure in the brake-cylinder, would frequently give such valve its entire throw and result in the release of the brakes. The important function of graduating would thus be to some extent interfered with, since it is desirable in the handling of a train to be able to admit into the brake-cylinders any desired amount or degree of fluid-pressure less than the maximum, and to retain or hold it there without material increase or diminution. This tendency of the valve referred to, to complete its back stroke under the circumstances named, results, in part, from the fact that the amount of force necessary to start the valve upward when the graduating-spring is not employed is frequently found to be more than enough to carry it to the end of its stroke after it is started. But with the explanation already given, it will be seen that the necessity of giving a back stroke to the valve H is wholly obviated, so far as relates to closing the ports and holding in the brake-cylinder any predetermined or limited amount of fluid-pressure, or to increase such pressure at pleasure, since, after the slide-valve H has been brought to the desired position, as set forth, a slight motion imparted to the piston G, and much less than would be necessary to start the valve H, will suffice to seat and unseat the auxiliary valve $e^1$, and so hold or retain in the brake-cylinder any desired pressure previously charged therein, or permit the increase thereof at pleasure.

Another part of my invention relates to the use of the auxiliary valve $e^1$ as a leakage-valve. When a car is disconnected from the train and run onto a siding, the auxiliary reservoir and brake-pipes are still charged with fluid-pressure. Leakage from the pipes, where it is greatest, results in the depression of the piston G until the port $s^2$ comes wholly or in part opposite the port C. As the intermediate full face of the valve is insufficient to cover entirely the port C, (the auxiliary valve $e^1$ being now unseated,) the fluid-pressure from the auxiliary reservoir will pass out slowly through $s^2$, $s$, and E, but about as fast as it will leak from the brake-pipes. Were it not for this port $s^2$, or some other leakage device, the port $s^1$ would be brought into communication with the port C so as to apply the brakes slowly at first, but eventually with maximum force, and hold them on for a considerable time. This would be highly objectionable, as it would interfere with the shifting of cars and other like operations, or even the running of a car, in case the brake apparatus of such car were disconnected, which it is sometimes necessary to do.

By the same device I provide for unexpected or accidental fluctuations of pressure slight in amount, such as are liable to occur while the pipes are connected and the train running, without danger of the brakes being applied thereto.

In Fig. 4 I have shown a strainer, $m$, arranged over the port leading from B to $B^1$, as a device to exclude or aid in excluding dust; also, in this figure, the ports from $B^1$ to $B^2$ are shown past the piston G instead of through it.

In both forms of the device I have shown a knob, $q$, projecting from the lower side of the piston G, as a device by which to get hold of the piston and pull it out, when necessary, for purposes of renewal, cleaning, or repairs. The necessity for this results from the fact that heretofore careless workmen have often used the graduating-stem for this purpose, and in doing so have bent the stem and caused trouble in the working of the valve.

The function of the large chamber B is chiefly that of a drip-cup, and to discharge the drip a hole and groove are made at $u$.

While in order to make my improvements clearly understood I have described and specified the devices with some minuteness, I still include herein known mechanical equivalents, or such substitutes for devices specified as involve a substantially like operation and result.

I claim herein as my invention—

1. In combination with the piston and stem of a triple valve, a valve, H, arranged on such stem, and having a short range of motion independent of such stem, in combination with an auxiliary valve operated by the same stem to close or open a port through the main valve without necessarily moving the main valve, substantially as set forth.

2. In a valve-case having a fluid-pressure-supply port, an auxiliary reservoir-port, a brake-cylinder port, and an exhaust-port, a valve, H, for governing the flow of air, provided with ports or passages $s$ $s^2$, and a fluid-pressure-supply port communicating with $s^2$, in combination with piston G, substantially as set forth with reference to the exhaustion without application of the brakes of the contained fluid-pressure.

3. The valve H, having cavity $s$, ports $s^1$, $s^2$, $c$, and $c^2$, in combination with valve $e^1$, substantially as set forth.

4. In combination with a triple valve of the class described, a strainer, $m$, arranged inside the valve-case and over or across the port leading to the piston-chamber, substantially as set forth.

In testimony whereof I have hereunto set my hand.

GEO. WESTINGHOUSE, JR.

Witnesses:
  R. H. WHITTLESEY,
  GEORGE H. CHRISTY.